United States Patent [19]

Fujisaki et al.

[11] 3,726,583
[45] Apr. 10, 1973

[54] REFLECTION-TYPE PROJECTION SCREEN

[75] Inventors: Hiroshi Fujisaki; Shizuo Miyano; Asaji Kondo, all of Asaka-shi, Saitama, Japan

[73] Assignee: Fuji Photo Film Co., Ltd., Minami Ashigara-shi, Kanagawa, Japan

[22] Filed: Oct. 29, 1970

[21] Appl. No.: 85,068

[30] Foreign Application Priority Data

Oct. 29, 1969 Japan..............................44/86581

[52] U.S. Cl. ................. 350/126, 350/127, 350/127
[51] Int. Cl. ........................................... G03b 21/60
[58] Field of Search.................... 350/127, 123, 125, 350/126, 129

[56] References Cited

UNITED STATES PATENTS 3,063,339  11/1962  Mihalakis et al. .................. 350/129
2,256,692  9/1941   Stableford ......................... 350/129
3,314,742  4/1967   Morgan ............................ 350/129

Primary Examiner—Samuel S. Matthews
Assistant Examiner—Richard M. Sheer
Attorney—Sughrue, Rothwell, Mion, Zinn & Macpeak

[57] ABSTRACT

A reflection type projection screen comprising an aluminum support, the surface of which has rolling stripes thereon. The surface of the support further having a light-reflecting property such that light impinging upon the surface of the support will be reflected in a direction such that the amount of light reflected in a direction perpendicular to the rolling stripes is 1.5 to 3.0 times that reflected in a direction parallel to the rolling stripes. The support further having coated thereon a light scattering layer comprising silica powder dispersed in a hydrophobic polymer, and method for preparing same.

12 Claims, 3 Drawing Figures

REFLECTION-TYPE PROJECTION SCREEN

BACKGROUND OF THE INVENTION

The present invention relates to a reflection-type projection screen wherein a light-scattering layer composed of silica powder dispersed in a hydrophobic polymer is formed on an aluminum support, having thereon, fine rolling strips in a definite direction. In this manner, the projected images on the screen can be observed as images having sufficient brightness. This holds true even in a light room and as another feature, the reflected light is provided with directionally as well.

For observing the reflected image of a cine film or a transparent positive film, a system is employed in which the image of the film is projected onto a screen and the reflected image is observed. It is normal to observe these reflected images on a screen in a dark room since the faculty of the screen is insufficient. That is to say, since a conventional screen is mainly composed of paper, cloth or an opaque matted base, such as resin layer containing white pigment, the projected light is scattered away in all directions and fails to come into the view of the observer. Therefore, the brightness of the image projected onto the screen is low. On the other hand, if such a screen is used in a light room, the contrast of the image is lowered by light uniformly provided onto the screen. Consequently, it is necessary, although undesirable, to darken the room for increasing the contrast of image. If however, it would be possible to practice projection in a light room, it would provide highly profitable.

It is therefore the primary object of the present invention to provide a projection screen which can function excellently in a light room and yet not inhibit the view to the audience.

SUMMARY OF THE INVENTION

The inventors have conducted many experiments based on the idea that, if the surface has the ability to reflect the greater part of the projected light as well as scatter effectively, the reflected light, a reflection type-projection screen can be provided, which produces a bright observable image.

BRIEF DESCRIPTION OF THE DRAWINGS

The invention will be further explained by referring to the accompanying drawings, in which.

Figure 1:
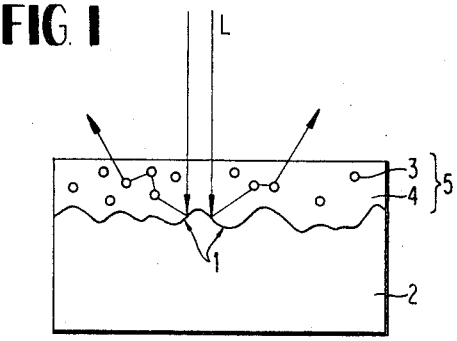
FIG. 1 is a cross-sectional view showing an embodiment of the reflection-type projection screen of this invention and, FIG. 2 (A) is a flat view and FIG. 2 (B) is a cross-sectional view showing an aluminum support used for the reflection-type projection screen.

The reflection-type projection screen of this invention has the elementary structure as shown in FIG. 1. A hydrophobic polymer layer 4, having dispersed therein fine silica powder 3, is formed as a light scattering layer 5, on an aluminum support 2, having on the whole surface thereof fine rolling stripes or light reflecting uneven stripes 1 in a definite direction.

Figure 2A:
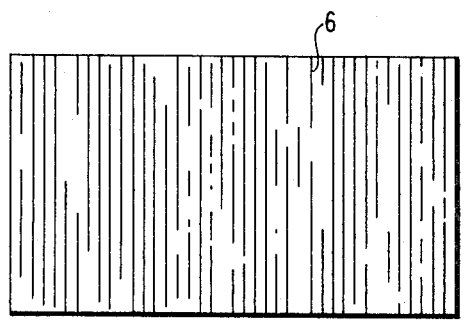
Figure 2B:

FIG. 2 (A) and FIG. 2 (B) illustrate the aluminum support 2 having rolling stripes 1 on the surface, which is used in the instant invention. When an aluminum plate or an aluminum foil is produced by rolling, cracks 6 are formed with distances of about 0.5 to about 20 microns by the rolling pressure. The direction of the cracks are perpendicular to the axial direction of the roll but the lengths and the depths of the cracks are irregular. FIG. 2(A) is a plane view showing the pattern of the cracks and FIG. 2 (B) is a cross-sectional view. As shown in FIG. 2(B), the surface has a very complicated uneven structure.

In the embodiment shown in FIG. 1, the light projected on the surface of the screen, perpendicularly from the direction L, is reflected at the strips on the aluminum surface in a direction perpendicular to the strips. Thus, there is less reflection in a direction parallel to the stripes. The light reflected at the stripes is further scattered by the silica powder dispersed in the light scattering layer to expand the direction. When light is projected effectively onto the projection screen of the present invention, a greater part of the light is reflected, thus contributing to the brightness of the screen. The reflected light has such directionality that the amount of the light reflected in the perpendicular direction of the rolling stripe is 1.5-3 times that reflected in the parallel direction to the stripe. Moreover, if the brightness of a standard aluminum oxide-type scattering plate is assumed to be one, the brightness of the projection screen of this invention ranges from 10 to 20.

The materials applicable to the present invention will be described as follows:

DETAILED DESCRIPTION OF THE INVENTION

The aluminum support contemplated is an aluminum foil or an aluminum plate rolled by a roll and preferably, an aluminum plate or foil which has from 200 to 2,000 rolling stripes per one cm. on the surface thereof. Moreover, if the surface is stained, the reflectivity of light is reduced and hence a fresh and stainless material is preferable as the aluminum support. The size of the silica powder is preferably less than 10 microns and it is highly desirable to use a suitable mixture of silica powders having the sizes of from 5 millimicrons to 5 microns. Illustrative of these are Siloid (made by Fuji Devillin Chemical Co.), Aerosyl (Degussa A. G.), and Carbosyl (made by Cabott Co.).

It is preferable that the hydrophobic polymer used in the present invention have good adhesivity to aluminum and very little color. Illustrative of these are resins having good solvent solubility, such as an unsaturated polyester resin, an alkyd resin, varnish, a vinylic resin, and an acrylic acid resin.

The amount of the silica powder may range from 1/20 to 2 times by weight of the polymer employed, and preferably, one-tenth to one-half by weight of the polymer.

The present invention relates to the improvements of the inventions of U.S Pat. Application Ser. Pat. No. 854,174 now U.S. Pat. No. 3,587,735 and 855,185, now abandoned. Since the polymers employed in the light scattering layer of the instant invention are hydrophobic in nature, water resistance and weather resistance of the projection screen is improved as compared, with those screens employing hydrophilic polymers as disclosed in the above mentioned applications. Furthermore, in the instant invention, the hydrophobic polymer contributes to protecting the surface of the aluminum support. The strength of the projection screen is greatly increased and the surface of the screen may be washed or wiped by cloth. When an aluminum support having a thickness of from 0.1 – 0.5 mm. is employed, the flatness of the screen is good and the screen is easily handled.

Preferably, the thickness of the light scattering layer should range from 5–100μ. Excellent results have been obtained with 15μ and 30μ.

A better understanding of the present invention will be obtained from the following examples which are merely illustrative and not limitative of the present invention. All parts are by weight unless otherwise stated.

EXAMPLE 1

An aluminum plate (made by Sumitomo Kinzoku K.K.) of 0.3 mm. in thickness 1 m. in width, and 0.8 m, in length and having distances of 5–20 microns between each rolling stripe was used as the support. Five parts of an aluminum-painting resin, Ester Resin -20 (trade name, made by ToyoBo K.K.) was dissolved in a mixed solvent of 15 parts(by volume) of methyl ethyl ketone ketone, 6 parts (by volume) of cellosolve acetate, 9 parts (by volume) of toluene, and 15 parts (by volume) of xylene. Then, 1 part of Carbosyl was dispersed in the solution by means of an ultrasonic emulsifying machine. The resultant dispersion was employed as the material for the light scattering layer.

By applying the dispersion to the aluminum support in a thickness of 15 microns and drying it, the projection screen of the present invention was obtained. When the projection screen was disposed so that the direction of the rolling stripes were perpendicular and a picture was projected on the screen, the brightness of the screen was 15 when the brightness of the standard scattering plate was taken as one. Also, the angle ( 0.5) at which the brightness of the light projected perpendicularly to the screen, was 15.5° in the width direction and 5.2° in the length direction.

EXAMPLE 2.

An aluminum plate (made by Alcoa Co.) of 0.2 mm. in thickness, 50 cm. in width, and 40 cm. in length and having the distance of 5–30 microns between each rolling stripe was used as the aluminum support. 20 parts of Ester Resin -20 was dissolved in a solvent mixture of 30 parts (by volume) of methyl ethyl ketone, 20 parts (by volume) of toluene, and 25 parts (by volume) of xylene. Then, 1 part of Carbosyl (silica powder having a size of an order of millimicrons) and 0.5 parts of Silonid (silica powder having a size of an order of millimicrons) were dispersed in the solution. The dispersion thus obtained was used as the material for the light scattering layer for the projection screen.

By applying uniformly the dispersion to the aluminum support in a thickness of 30 microns, the projection screen of the present invention was obtained.

The brightness of the projection screen was 11, and the angle ($\theta 0.5$) thereof was 14.4 in the width direction and 5.7 in the length direction. When a cine 8 mm film was projected on the screen in a light room, free from direct sunlight, the image could be observed satisfactorily.

Although the present invention has been adequately described in the foregoing specification and examples included therein, it is readily apparent that various changes and modifications may be made without departing from the scope thereof.

What is claimed is:

1. A reflecting type projection screen comprising a light reflecting aluminum support, the surface of which has rolling stripes imparted thereon by passing said aluminum support between rollers; the surface of said aluminum support further having a light reflecting property such that light impinging thereon is reflected therefrom in such directionality that the amount of light reflected in a direction perpendicular to the rolling stripes is 1.5 to 3.0 times that reflected in a direction parallel to the rolling strips; said aluminum support having coated thereon a light scattering layer comprising silica powder dispersed in a hydrophobic polymer.

2. The projection screen of claim 1, wherein said hydrophobic polymer is a member selected from the group consisting of an unsaturated polyester resin, an alkyd resin, a varnish, a vinylic resin and an acrylic resin.

3. The projection screen of claim 1, wherein the particle size of said silica powder is less than 10μ.

4. The projector screen of claim 3, wherein the particle size of said silica powder ranges from 5 mμ to 5μ.

5. The projection screen of claim 1, wherein the amount of said silica powder ranges from 1/20 to 2.0 times by weight of the hydrophobic polymer.

6. The projector screen of claim 5, wherein the amount of said silica powder ranges from one-tenth to one-half times by weight of the hydrophobic polymer.

7. The projection screen of claim 1, wherein the thickness of said light scattering layer ranges from 5 to 100 μ.

8. The projection screen claim 1, wherein the thickness of the aluminum support ranges from 0.1 to 0.5mm.

9. The projection screen of claim 1, wherein the amount of rolling stripes present ranges from 200 to 2,000 /1cm. on the surface.

10. The projection screen of claim 7, wherein the thickness of the light scattering layer is 15 μ.

11. The projection screen of claim 7, wherein the thickness of the light scattering layer is 30 μ.

12. The projection screen of claim 1, wherein the distance between the rolling stripes ranges from 0.5 to 20 μ.

* * * * *